Figure 1:
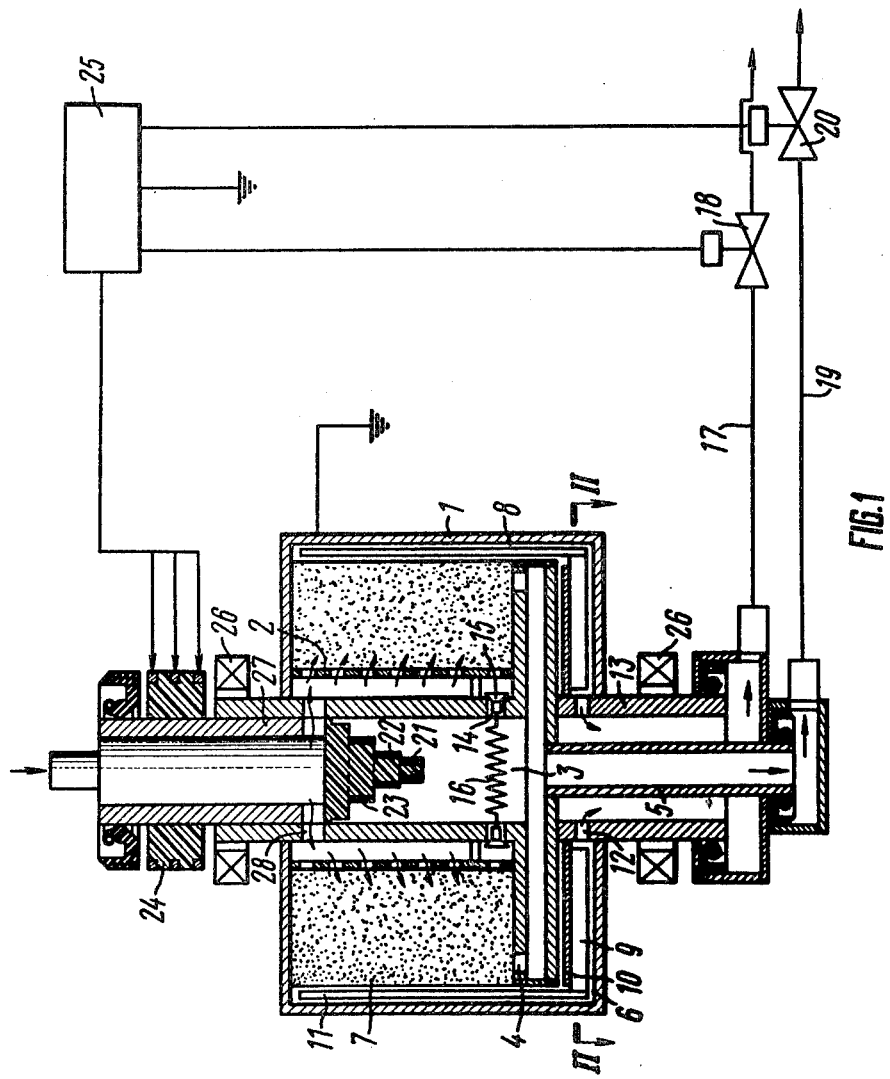

United States Patent [19]

Khapaev

[11] 4,209,127
[45] Jun. 24, 1980

[54] METHOD OF BREAKING DOWN EMULSIONS AND A DEVICE FOR CARRYING SAME INTO EFFECT

[76] Inventor: Vadim M. Khapaev, ulitsa Gogolya, 7 kv. 11, Sevastopol, U.S.S.R.

[21] Appl. No.: 871,465

[22] Filed: Jan. 23, 1978

[30] Foreign Application Priority Data

Mar. 23, 1977 [SU] U.S.S.R. .............................. 2465157

[51] Int. Cl.$^2$ ......................... B04B 1/14; B04B 11/08
[52] U.S. Cl. ...................................... 233/3; 233/20 R
[58] Field of Search .................. 233/20 A, 19 R, 3, 2, 233/27, 20 R, 28, 46; 210/23 R, 40

[56] References Cited

U.S. PATENT DOCUMENTS

| 712,390 | 10/1902 | Knudsen | 233/3 |
| 893,299 | 7/1908 | Bellany | 233/2 X |
| 2,399,140 | 4/1946 | Peters et al. | 233/34 X |
| 3,179,603 | 4/1965 | Edwards et al. | 210/23 R |
| 3,219,264 | 11/1965 | Cox | 233/2.8 X |

FOREIGN PATENT DOCUMENTS

| 621908 | 11/1935 | Fed. Rep. of Germany | 233/20 R |
| 877575 | 5/1953 | Fed. Rep. of Germany | 233/20 R |
| 1158905 | 12/1963 | Fed. Rep. of Germany | 233/20 R |

Primary Examiner—George H. Krizmanich
Attorney, Agent, or Firm—Steinberg and Blake

[57] ABSTRACT

The method of breaking down emulsions resides in that the emulsion is made to bubble through a coalescent matter of a pelletized polymeric material featuring its specific gravity below that of the lighter emulsion component, said matter being filled with said lighter component of the emulsion under process and being exposed to the effect of the field of centrifugal forces. The device for breaking down emulsions is in fact a centrifugal separator whose bowl has respective chambers for the lighter and the heavier emulsion components to collect, said chambers communicating with the bowl interior space. A perforated inlet sleeve is provided coaxially with the bowl axis for admission of the emulsion being broken down while the bowl interior is filled with the coalescent matter made of the pellitized polymeric material.

6 Claims, 2 Drawing Figures

METHOD OF BREAKING DOWN EMULSIONS AND A DEVICE FOR CARRYING SAME INTO EFFECT

This invention relates to methods of breaking down various emulsions and to devices for carrying said methods into effect.

The invention can find most utility when applied for clarifying oil-polluted ship's ballast and bilge water from liquid petroleum products.

Known in the present state of the art is a method of breaking down emulsions in a centrifugal force field, applicable for clarifying water from liquid petroleum products and consisting in that the oil-in-water emulsion is passed through a coalescent filling matter mounted within the zone of breaking-down.

The device for carrying said method into effect is essentially a chamber-type centrifugal separator, comprising a hollow bowl with an inlet sleeve through which the oil-in-water emulsion is admitted.

The bowl interior is subdivided into three chambers as for length which serve sequentially for spreading the oil-in-water emulsion over the bowl interior, holding the coalescent filling matter which is in fact a number of coaxially arranged stiff cylinders made of said filling matter, and collecting the clarified water, the latter chamber being communicated with the peripheral zone of the bowl interior and having an outlet sleeve. A perforated tube is accommodated inside the bowl lengthwise the axis thereof, adapted for collecting the separated petroleum products and provided with an outlet sleeve.

The oil-in-water emulsion is admitted into the bowl interior of the revolving chamber-type centrifugal separator to pass through the emulsion spreading chamber and the chamber filled with the coalescent matter.

It is under the action of the centrifugal force field and the effect of coalescence that the oil-in-water emulsion breaks down, and water as being the heavier component thereof is displaced towards the bowl periphery, while the petroleum products as the lighter component of the emulsion are displaced towards the axis of rotation of the bowl. Then the water clarified from the petroleum products is fed to the collection chamber and further is discharged from the bowl through the outlet sleeve thereof, whereas the petroleum products are collected in the perforated tube at the bowl centre and are then discharged therefrom through that tube.

However, the afore-discussed heretofore-known method and device fail to provide a possibility of a high-degree break-down of fine emulsions due to piston-type motion of the emulsion through the coalescent matter, whereby the layers of the oil-in-water emulsion adjacent to the axis of the bowl rotation fail to be acted upon by a rather strong centrifugal force field.

Furthermore, the coalescent material itself must be fixed in position in a rigid enough manner within the bowl interior so as not to be displaced towards the bowl periphery or axis of rotation due to its own specific gravity. In either of the cases a possibility arises for the emulsion to by-pass the coalescent matter which results in a drastic change of the petroleum product concentration in the clarified water.

As the coalescent filling matter is made of an unyielding material, it proves to be sensitive to mechanical suspensions which are liable to block up the void volume thereof, i.e., the cylinder-to-cylinder ducts, increase hydraulic friction, and adds to the flow velocities of the oil-in-water emulsion, thereby rendering high-degree break-down of the emulsion impossible.

Of no less importance is the fact that use of stiff unyielding coalescent materials excludes their recovery, that is, adequate cleaning of mechanical suspended matter.

Use of coalescent filling agents featuring high specific void volume results in a reduced active surface area thereof and, therefore, affects adversely the clarifying capacity of the device. It is likewise essential that experience in operating such filling materials has proven their service life to be as short as 100 hours.

The afore-mentioned device does not contain elements preventing the separated petroleum products from getting into the clarified water chamber, thereby making it impossible for the device to operate within any arbitrary concentration of petroleum products in the initial emulsion and, as a rule, makes for high water content of the separated petroleum products themselves.

The known device makes no provision for cleaning the bowl inside surface of mechanical suspended matter deposited thereupon, said deposited matter reducing the bowl useful volume with time and thereby impairing the degree of breaking-down of emulsions.

The known device requires high bowl rotational speed which places limitations upon the field of application thereof as it makes the device difficult to use under conditions of ship's motions.

It is an object of the present invention to attain a higher degree of breaking down emulsions.

It is another object of the present invention to exclude the adverse effect of mechanical suspended matter contained in the emulsion under process, upon stable operation of the device for breaking down emulsions.

It is still another object of the present invention to provide a reliable breaking down of emulsions whatever the concentration of the lighter component in the emulsion and the type of the pump forcing the emulsion through the device for its breaking down.

It is yet still another object of the present invention to provide a device for breaking down emulsions whose overall dimensions would enable it to be applied on any ship irrespective of their purpose and tonnage, for clarifying bilge water from petroleum products.

It is one more object of the present invention to provide full automation of the operation of the device for breaking down emulsions featuring any concentration of the lighter component thereof.

The essence of the present invention resides in that in a method of breaking down emulsions in the field of centrifugal forces, wherein emulsion is passed through a coalescent filling matter situated within the breakdown zone, according to the invention used as the coalescent matter is a porous medium made from a pelletized polymeric material featuring a specific gravity lower than that of a lighter component of the emulsion being handled, and when passed through the coalescent matter the emulsion is made to bubble through said porous medium filled with the lighter component of the emulsion being handled.

The herein-proposed method enables one to attain the degree of breaking down emulsions one or two orders of magnitude higher than in the known devices. Use of pelletized filler agent having a specific gravity lower than that of the lighter emulsion component provides for establishing a dense ring of the pellets themselves of the coalescent filler agent, located at the centre of the break-down zone in the field of action of centrifugal forces, said pellets having a minimum size of the voids thereof with respect to the total voids content, a feature that tells very favourably on the emulsion breaking-down efficiency. However, an excessively reduced void content of the filler agent is fraught with a danger of blocking up the voids by mechanical suspended matter of a size larger than the size of the void clear area. On the other hand, any increase in the clear passage area of voids of the pelletized filler agent is equivalent to a reduction in the active surface of the filler agent itself and, accordingly, to a lower efficiency of breaking down the emulsion into its components. It is proceeding from the above reasons that the bubbling of emulsions through the voids of the filler agent full of the lighter emulsion component itself makes it possible to employ a pelletized filler agent whose voids have the clear passage area large enough to preclude blocking up the filler agent with mechanical suspended matter. Besides, the presence of the lighter emulsion component in the filler voids simulates and plays the part of an active coalescent surface. Moreover, the emulsion fed into the bowl interior constantly replenishes and revivifies the voids of the pelletized filler agent with the lighter emulsion component, thereby keeping up automatically their composition in correspondence with that of the lighter component in the emulsion proper.

In a device for carrying into effect the method of breaking down emulsions, made essentially as a chamber-type centrifugal separator, comprising a hollow bowl having an inlet sleeve for the emulsion being handled to admit, said bowl having a chamber for the heavier emulsion component to collect, which chamber communicates with the peripheral zone of the bowl interior and is provided with an outlet sleeve, and a chamber for the lighter emulsion component to collect, said chamber communicating with the bowl interior and having an outlet sleeve, as well as a coalescent filling matter held in the bowl interior, according to the invention the inlet sleeve for admission of the emulsion being handled is perforated and is arranged coaxially with the axis of the bowl rotation, the coalescent filling matter is in effect the pellets of a polymeric material having a specific gravity lower than that of the lighter emulsion component, said pellets occuppying the space confined within the walls of the bowl and the perforated sleeve, whereas the chamber for the lighter emulsion component to collect is communicated with the bowl interior within the zone adjacent to the periphery of the zone of discharge of the heavier emulsion component from the bowl.

Feeding the emulsion through the perforated sleeve arranged coaxially with the bowl itself, averts piston-type movement of the emulsion in the interior thereof and formation of stagnation zones that provoke reduction of the clarifying capacity of the device and thereby pollution of the clarified water with the lighter emulsion component. Meanwhile, the presence of a pelletized filler agent in the bowl interior, whose specific gravity is lower than that of the lighter emulsion component provides for establishing a dense ring of the pellets themselves situated round the perforated sleeve, the packing closeness of said pellets being defined automatically by the volume flow rate of the emulsion under process and the magnitude of the centrifugal force field. In addition, should the clear passage areas of the filler agent be partially clogged up by mechanical suspended matter, an optimum area of the void passages remains unaffected alongside with the amount of the hydraulic friction of the emulsion passing therethrough, this being due to the fact that the pellets are not mechanically interlinked.

Furthermore, as the voids themselves of the pelletized filling agent are constantly filled with the lighter emulsion component, this provides for favourable conditions, when breaking down oil-in-water emulsions, for self-washing the pellets from mechanical suspended matter getting stuck to the surface thereof.

The device of the present invention with a capacity of 0.6; 3.0; and 12 ton/hour has been used for clarification of ship's oil-polluted water under ship's trial conditions in various fishing areas of the Northern and Southern Atlantic to give full evidence of operational reliability of the elements thereof and high clarifying capacity at a level of pollution not in excess of 2 to 5 parts per million whatever the concentration of petroleum products at the inlet of the device, sea-water temperature, the type of ship's power plant and grade of fuel used.

The device of the present invention can operate without preheating the oil-in-water emulsion and make use of any type of transfer pumps, centrifugal inclusive. The devices of the character set forth in this invention fully conform, according to their characteristics, to the Recommendations of the Intergovernmental Maritime Consulative Organization (IMCO) and to its resolutions adopted at London in 1973.

The overall dimensions and weight of the devices made according to the present invention enable these to be used on every ship irrespective the type, purpose and displacement thereof. Thus, e.g., a device having a capacity of 1.0 ton/hour weighs 117 kg.

It is expedient that the chamber for collecting the heavier emulsion component be made ring-shaped and be communicated with the bowl interior through an annular slit and that the bowl interior accommodate scrapers adhering to the inner walls thereof and held to the vanes of a reaction impeller situated in the chamber for collecting the heavier emulsion component with a possibility of freely rotating under the effect the latter passing through the chamber.

Transfer of the clarified heavier component from the bowl interior to the chamber for its collection, followed by its passing from the bowl periphery through the reaction impeller towards the outlet sleeve, establishes torque high enough to set the impeller in rotation along with the vertical scrapers which remove mechanical deposits from the bowl inner surface.

It is likewise desirable that the chamber for the lighter emulsion component to collect be communicated with the bowl central zone adjacent to the outer surface of the perforated sleeve for the emulsion to admit, through ducts closed by spring-loaded centrifugal valves.

The above feature excludes accumulation of noncondensable gases within the bowl interior, which interfere with the bubbling process of the emulsion under treatment through the liquid lighter component, thereby disturbing the entire break-down process.

A number of electrodes are expedient to be provided in the bowl interior, said electrodes being spaced differently apart from the axis of the bowl rotation, whereas the outlet sleeves of the chambers for the lighter and the heavier emulsion component to collect are preferably provided with solenoid-operated valves controlled automatically by said electrodes depending upon the level of the lighter component inside the bowl interior. This feature enables one to preclude the penetration of the lighter component in the piping that handles the clarified heavier emulsion component and provide an automatic operation of the devices under any conditions irrespective of the concentration of one of the components in the emulsion itself.

Figure 2:
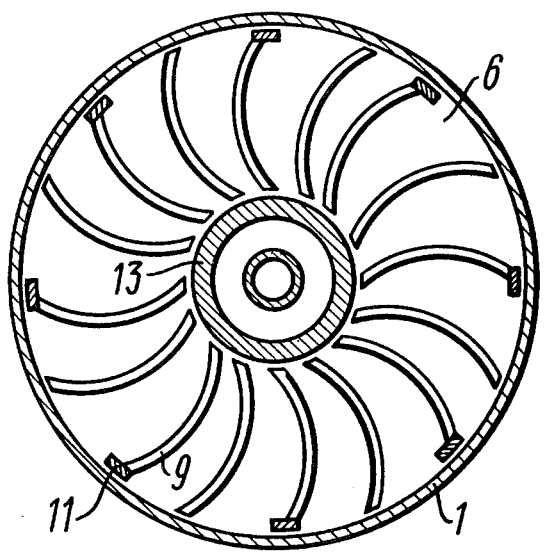

In what follows the present invention is illustrated in a disclosure of an exemplary embodiment thereof with reference to the accompanying drawings, wherein:

FIG. 1 is a longitudinal section view of a device for breaking down emulsions, according to the invention; and FIG. 2 is a section taken along the line II—II in FIG. 1.

The device for breaking down emulsions accomplished according to the present invention comprises a chamber-type centrifugal separator having a hollow bowl 1 (FIG. 1) provided with a perforated sleeve 2 arranged coaxially lengthwise with respect to the axis of rotation of the bowl 1 and adapted for a uniform admission of the emulsion to and distribution within the interior of the bowl 1. The bowl 1 is provided with a chamber 3 for collection of the lighter emulsion component. Said chamber 3 communicates with the interior of the bowl 1 through holes 4 located in the zone adjacent to the peripheral zone, wherefrom the heavier emulsion component is discharged from the bowl 1. The chamber 3 is provided with an outlet sleeve 5 for discharge the lighter emulsion component therefrom.

A chamber 6 for the heavier emulsion component to collect is provided in the bottom portion of the bowl 1 under the chamber 3. The interior space of the bowl 1 confined within the walls thereof and the perforated sleeve 2 is filled with a pelletized coalescent matter 7 made of a polymeric material whose specific gravity is lower than that of the lighter component of the emulsion being broken down.

The chamber 6 is ring-shaped and communicates with the peripheral zone of the interior of the bowl 1 through an annular slit 8 defined by the walls of the bowl 1 and the chamber 3.

A reaction impeller defined by outwardly extending curved vanes 9 fixed to a rotatably mounted disk 10, is mounted inside the chamber 6, said impeller being set in rotation by the flow of the heavier component while it is passing through the chamber 6.

Thus, the rotation of vanes 9 is effected through the flow of the separated heavier emulsion component in the inward direction, i.e., from the internal surface of the rotary bowl 1 towards the central outlet sleeve 13 which is coaxial with the axis of rotation of bowl 1. The heavy emulsion component passes over the curved surface of vanes 9 resulting in the rotation of the impeller due to the curvature of vanes 9. (FIGS. 1, 2) held together by a disk 10 (FIG. 1).

The tips of the vanes 9 of the impeller carry scrapers 11 which rotate along with the reaction impeller and are permanently forced against the inner surface of the bowl 1 by virtue of centrifugal force.

The chamber 6 communicates with an outlet sleeve 13 via holes 12.

The chamber 3 for collecting the lighter component communicates with the central zone of the bowl 1 adjacent to the outer surface of the sleeve 2 through ducts 14 closed by centrifugal valves 15 which are loaded by a spring 16.

The outlet sleeve 13 of the chamber 6 communicates with a piping 17 closed by a solenoid-operated valve 18, while the outlet sleeve 5 communicates with a piping 19 closed by a solenoid-operated valve 20.

The chamber 3 accommodates coaxial, mutually electrically isolated ring electrodes 21, 22, 23 having stepped diameters increasing in the upper direction, the electrodes being electrically connected through a collector 24 to a unit 25 to control the valves 18, 20 in keeping with the level of petroleum products inside the chamber 3, said unit being electrically connected to the valves 18, 20. More particularly, each one of the ring electrodes 21, 22, and 23 is electrically connected through conductors (not shown) with a corresponding one of the three rings of the collector 24. The collector rings are electrically connected to the valve control unit 25 through current take-off brushes as seen in FIG. 1.

The unit 25 may be of any heretofore known construction.

The bowl 1 runs in bearings 26 mounted on a top half-shaft 27 and on the sleeve 13 which serves as the bottom half-shaft of the device.

The top half-shaft 27 serves also for feeding the emulsion through holes 28 to the perforated sleeve 2, as well as for mounting the collector 24 thereon.

The method of the present invention of breaking down emulsions is carried into effect as follows.

The emulsion to be broken down is fed by the transfer pump (not shown) through the top half-shaft 27, the holes 28 and the perforated sleeve 2 in a uniformly spread flow to get into the interior of the bowl 1 filled with the pelletized coalescent matter 7. Under the effect of the centrifugal force field created through rotation of bowl 1, coalescence occurs on the surface of the pellets of the filling matter 7 and the bubbling of the emulsion through the voids of the filling matter 7 preliminarily filled with the lighter emulsion component causes the emulsion to be broken down into its components, viz., the lighter and the heavier ones. Then the heavier emulsion is displaced towards the bowl periphery, wherefrom it passes through the annular slit 8 to the chamber 6 whereupon the component flows through the holes 12, the sleeve 13, the piping 17 and the solenoid valve 18 to be discharged from the interior of the bowl 1.

The separated lighter emulsion component, having lower specific gravity, accumulates in the voids of the pelletized filling matter 7 as fast as the bowl 1 rotates to saturate the filling matter, thereby providing automatically the bubbling of the emulsion through its own lighter component. The surplus of the lighter component is fed through the holes 4 to the chamber 3 and, with the solenoid valve 20 open, is discharged from the interior of the bowl 1 through the piping 19 and the sleeve 5 (the direction of the flow of emulsion and the components thereof being shown by the arrows in FIG. 1).

If noncondensable gases, such as air, are present in the emulsion, such gases which have a lower specific gravity, are liable to accumulate in the central zone of the bowl 1 adjacent to the perforated sleeve 2 and the centrifugal valve 15. It is under the effect of a difference between the specific gravities of the material of the valve 15 and of the noncondensable gases themselves that a centrifugal force arises which overcomes the tension of the spring 16, whereby the valve 15 opens to discharge the noncondensable gases into the chamber 3, from whence said gases are withdrawn along with the lighter emulsion component.

When the heavier component is passed through the chamber 6, a rotational force is impressed on the vanes 9 of the reaction impeller as described above, whereby the latter is made to rotate at an angular velocity different from that of the bowl 1. While rotating, the reaction impeller imparts rotation to the scrapers 11 locked-in therewith, which scrapers are forced against the inner surface of the bowl 1 by virtue of centrifugal force to slide over that surface, thereby preventing mechanical suspended matter from getting deposited upon the walls of the bowl 1.

To exclude penetration of the lighter component into the piping that handles the heavier component, whatever the concentration of either of the components, it is expedient that use be made of an automatic control of the solenoid valves 18 and 20 depending upon the level of the lighter component in the chamber 3.

When the heavier emulsion component is essentially a current-conducting liquid the automatic control system of the solenoid valves 18 and 20 operates as follows.

When the heavier component alone is fed into the interior of the bowl 1 the chamber 3 is filled therewith as high as to the level of the electrode 21. This being the case, the lighter component filling the voids of the pelletized filling matter 7 is at the level corresponding to the position of the holes 4 in the chamber 3, whereas inside the chamber 3 it is located at the level of the electrode 21.

It is due to electrical conduction properties of the heavier component that electric current flows between the electrodes 22 and 23, said current being registered by the unit 25, with the result that a command is delivered by the latter for the valve 18 to open and the valve 20 to close.

When a two-component liquid, the lighter component being a nonconducting liquid, the latter upon supersaturating the pelletized filling matter 7, gets accumulated in the chamber 3 and overruns the electrode 22, thus opening the electric circuit which is sensed by the units 25 to deliver a command for the solenoid valve 20 to keep open until the electrode 22 gets rid of the lighter emulsion component, whereupon the electric circuit restores continuity, and the solenoid valve 20 recloses.

In the case of a very high percentage of the lighter component in the emulsion being handled, circuit deenergizing is likely to occur at the electrode 23 as the lighter component will not have time enough to with withdrawn from the chamber 3. Such being the case the unit 25 sends a command for the solenoid valve 18 to keep closed until the lighter emulsion component clears the electrode 23.

When handling emulsions, wherein the lighter component is a current-conductive liquid and the heavier component, a nonconductive one, the sequence of operation of the solenoid valves 18 and 20 is reversed.

In summary, it is seen that the sequence of operations for automatically controlling the opening and closing of the electromagnetic valves depends on the concentration of the liquid components in the emulsion. Thus, in the case where only one of the components of the emulsion (i.e., in the case of a single-phase liquid) is supplied into the cavity of bowl 1, the chamber 3 will be filled to a level whose plane transversely intersects the ring electrode 21 but which remains below the ring electrode 22 thereby causing an electric current to be transmitted through ring electrodes 22, 23 to control unit 25 which thereby generates a signal for opening the valve 18 and closing the valve 20. Valves 18 and 20 will remain open and closed, respectively, so long as the current continues to flow through electrodes 22 and 23. In the case where the emulsion contains the second phase, the latter will find chamber 3 to a level which transversely intersects ring electrode 22, thereby breaking the electric current between the latter and the control unit 25. This in turn causes the control unit 25 to generate a signal for opening valve 20 until the lighter emulsion component is separated whereupon the level of the liquid in chamber 3 drops and an electric current is reestablished with control unit 25 so as to reclose valve 20. However, if the concentration of the second phase is sufficiently high so that there is insufficient time for the same to be removed from chamber 3 through pipeline 19 and valve 20, the level of the emulsion will rise until it transversely intersects electrode 23 whereupon the electric circuit between the latter and the control unit will be broken. In this case, control unit 25 will generate a signal for closing the valve 18 until the level of the emulsion descends below electrode 23 whereupon the electric circuit between electrode 23 and control unit 25 is restored whereupon valve 18 is again reopened.

A specific embodiment of the device for breaking down emulsions as represented in FIG. 1 the electrodes 21, 22, 23 are accommodated in the chamber 3. However, these may be housed in the interior of the bowl 1 filled with the coalescent matter 7, at a distance from the axis of rotation of the bowl 1 not in excess of the distance from the level of the holes 4 in the chamber 3 to the axis of rotation of the bowl 1.

What is claimed is:

1. A device for breaking down emulsions, comprising: a centrifugal separator; a bowl of said separator; a perforated sleeve for the emulsion under process to admit to said bowl, said sleeve being arranged lengthwise the axis of rotation of said bowl; a chamber for the heavier emulsion component to collect, accommodated in said bowl and communicated with the peripheral zone of the interior thereof; an outlet sleeve of said chamber for the heavier emulsion component to collect; a chamber for the lighter emulsion component to collect, accommodated in said bowl and communicated with the bowl interior in the zone adjacent to said bowl peripheral zone wherefrom the heavier emulsion component is discharged; an outlet sleeve of said chamber for the lighter component to collect; a pelletized coalescent filling matter made from a polymeric material whose specific gravity is lower than that of the lighter emulsion component, said filling matter being placed in said bowl to occupy the space therein confined within the both walls and its said perforated sleeve.

2. A device as claimed in claim 1, comprising: said chamber for the heavier emulsion component to collect being ring-shaped and communicating with the interior of said bowl through an annular slit; a reaction impeller accommodated in said chamber for the heavier emulsion component to collect with a possibility of freely rotating under the effect of the flow of the heavier emulsion component passing through said chamber; vanes of said reaction impeller; scrapers situated in said bowl, adhering to the walls thereof and held to said vanes.

3. A device as claimed in claim 1, comprising: a number of ducts communicating said chamber for the lighter emulsion component to collect with the central zone of said bowl, adjacent to the outer surfaces of said perforated sleeve for the emulsion to admit; spring-loaded centrifugal valves adapted for said ducts to close.

4. A device as claimed in claim 2, comprising: a number of ducts communicating said chamber for the lighter emulsion component to collect with the central zone of said bowl, adjacent to the outer surface of said perforated sleeve for the emulsion to admit; spring-loaded centrifugal valves adapted for said ducts to close.

5. A device as claimed in claim 1, comprising: a number of electrodes spaced in said bowl differently apart from the axis of rotation of said bowl; solenoid-operated valves provided on said outlet sleeves of the chamber for the lighter emulsion component to collect and of the chamber for the heavier emulsion component to collect, said valves being automatically controlled by said electrodes depending on the level of the lighter emulsion component inside the bowl.

6. A device as claimed in claim 4, comprising: a number of electrodes spaced in said bowl differently apart from the axis of rotation of said bowl; solenoid-operated valves provided on said outlet sleeves of the chamber for the lighter emulsion component to collect and of the chamber for the heavier emulsion component to collect, said valves being automatically controlled by said electrodes depending on the level of the lighter emulsion component inside the bowl.

* * * * *